US009200900B2

(12) United States Patent
Fessler et al.

(10) Patent No.: US 9,200,900 B2
(45) Date of Patent: Dec. 1, 2015

(54) CONSTRUCTION LASER SYSTEM WITH AN AT LEAST PARTIALLY AUTOMATICALLY RUNNING RECALIBRATION FUNCTIONALITY FOR A BEAM LEVELLING FUNCTIONALITY

(71) Applicant: Leica Geosystems AG, Heerbrugg (CH)

(72) Inventors: Thilo Fessler, Hard (AT); Bernd Stöckel, Rebstein (CH); Thomas Ammer, Widnau (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 101 days.

(21) Appl. No.: 14/218,621

(22) Filed: Mar. 18, 2014

(65) Prior Publication Data
US 2014/0283399 A1 Sep. 25, 2014

(30) Foreign Application Priority Data

Mar. 19, 2013 (EP) ..................................... 13160069

(51) Int. Cl.
*G01C 15/00* (2006.01)
(52) U.S. Cl.
CPC ............ *G01C 15/008* (2013.01); *G01C 15/004* (2013.01)
(58) Field of Classification Search
CPC ... G01C 15/004; G01C 15/006; G01C 15/008
USPC ..................................... 33/290, 291, 293, 294
See application file for complete search history.

(56) References Cited

U.S. PATENT DOCUMENTS

| 4,240,208 | A | 12/1980 | Pehrson |
| 5,485,266 | A | 1/1996 | Hirano et al. |
| 6,043,874 | A | 3/2000 | Detweiler |
| 6,055,046 | A | 4/2000 | Cain |
| 6,314,650 | B1 | 11/2001 | Falb |

(Continued)

FOREIGN PATENT DOCUMENTS

| EP | 1 790 940 A2 | 5/2007 |
| EP | 1 901 034 A2 | 3/2008 |

(Continued)

OTHER PUBLICATIONS

European Search Report dated Aug. 2, 2013 as received in Application No. EP 13 16 0069.

*Primary Examiner* — G. Bradley Bennett
(74) *Attorney, Agent, or Firm* — Maschoff Brennan

(57) ABSTRACT

A construction laser system includes a rotating laser with self-leveling and a laser receiver. The system performs a self-leveling recalibration process by which the self-leveling is checked automatically for quality and the related calibration data is updated automatically. A sequence of N calibration measurements is defined, where N is greater than or equal to three. The calibration measurements are obtained by the rotating laser and the laser receiver with a respective azimuthal alignment of the stand while the position of the laser receiver remains unchanged. As part of each calibration measurement, one output signal dependent on the laser beam impingement position is detected. The respective output signals or specified impingement positions are evaluated in pairs correlated with the respective I-th azimuthal alignments. The quality of the beam leveling functionality is thereby checked. If the requirements are not met, the previously stored calibration data can then be updated automatically.

20 Claims, 4 Drawing Sheets

(56) References Cited

U.S. PATENT DOCUMENTS

| | | |
|---|---|---|
| 6,693,706 B2 | 2/2004 | Kahle et al. |
| 7,793,424 B2 * | 9/2010 | Laabs et al. .................... 33/290 |
| 2004/0125356 A1 | 7/2004 | Connolly |
| 2009/0235541 A1 * | 9/2009 | Kumagai et al. ................ 33/281 |
| 2012/0130675 A1 * | 5/2012 | Schorr et al. .................. 702/154 |
| 2014/0283397 A1 * | 9/2014 | Fessler et al. .................. 33/228 |
| 2015/0138528 A1 * | 5/2015 | Luthi et al. ................... 356/4.01 |
| 2015/0160009 A1 * | 6/2015 | Bank ............................... 33/290 |

FOREIGN PATENT DOCUMENTS

| | | |
|---|---|---|
| EP | 2 144 037 A1 | 1/2010 |
| EP | 2 199 739 A1 | 6/2010 |
| EP | 2 327 958 A1 | 6/2011 |
| EP | 2 522 954 A1 | 11/2012 |
| EP | 2 741 049 A1 | 6/2014 |
| EP | 2 781 879 A1 | 9/2014 |
| WO | 2006/070009 A2 | 7/2006 |

* cited by examiner

CONSTRUCTION LASER SYSTEM WITH AN AT LEAST PARTIALLY AUTOMATICALLY RUNNING RECALIBRATION FUNCTIONALITY FOR A BEAM LEVELLING FUNCTIONALITY

FIELD OF THE INVENTION

The invention relates to a construction laser system for work in construction and/or interior design, comprising a rotating laser and a laser receiver with improved functionality in terms of provision complexity and implementation speed for determining a direction in which the laser receiver is located, from the point of view of the rotating laser. In addition, the invention relates to a corresponding method using a rotating laser and a laser receiver, wherein determination of the direction in which the laser receiver is located, from the point of view of the rotating laser, is performed in an improved manner, and to a computer program product for implementing this method.

BACKGROUND

It is known to use rotating lasers on building sites, for example of buildings or in roadbuilding work and/or groundworks. In particular, rotating lasers are used in which a laser beam (in the visible or infrared wavelength range) emitted by a laser unit generates a reference area, by deflection via a rotating deflecting prism, by means of which reference area a precise plane reference (in particular a height reference in the case of a horizontal plane) is then provided.

Many of the rotating lasers in existence nowadays have a beam self-leveling functionality. In order to fulfill such a beam self-leveling functionality, various technical solutions are known which can be purely mechanical in nature but are nowadays usually based on a sensor system which is optical in nature. For example, the core of the rotating laser (i.e. the laser core module), which comprises in particular the laser unit and the rotatable deflecting prism, can be suspended in oscillating fashion, with the result that leveling accuracy can be produced using gravity. However, in this case, the laser core module can advantageously be suspended on an outer housing of the device in a manner such that it can be inclined precisely, in motorized fashion, about two axes (at least slightly in a range of, for example, ±5°) and can be equipped with an inclination sensor or leveling sensor, whose indication or signal can be read and used as output variable for actively changing the position of inclination of the laser core module.

Depending on the development stage, known rotating lasers nowadays in this case also have a function (with corresponding mechanical system, sensor system and control system) for the dedicated, desired inclination of the laser plane relative to the horizontal in one or two directions. For this purpose, the core of the rotating laser, which in particular comprises the laser unit and the rotatable deflecting prism, can be inclined in a targeted manner in motorized fashion about an axis or about two axes and brought into desired positions of inclination, with the result that, therefore, the axis of rotation and consequently also the plane spanned are also inclined in a desired manner. Corresponding mechanisms, sensor systems and control systems for this have long been known from the prior art and are described, for example, in the patent literature publications U.S. Pat. No. 5,485,266 A, US 2004/0125356 A1, EP 1 790 940 A2, EP 1 901 034 A2, EP 2 327 958 A1 and EP 2 522 954 A1.

If, in this case, the rotating laser beam emitted by the rotating laser is transmitted in the visible spectrum and impinges on an area such as, for example, a wall, a floor or a ceiling of the building, a reference line is visible there as the basis for further measurements.

For precise transmission of the reference plane or reference height given by the rotating laser beam onto a wall or onto the site for example, handheld laser receivers are known which can determine and indicate with high precision a position relative to a reference area spanned by the rotating laser.

Handheld laser receivers known from the prior art for determining a position relative to the reference area can in this case have a laser beam detector, which comprises a multiplicity of photosensitive elements and is designed to generate an output signal in the event of impingement of the laser beam on the laser beam detector. In detail, in this case the laser beam detector is usually designed in such a way that, in addition, an impingement position of the laser beam on the laser beam detector area can be derived, for which purpose the photosensitive elements, when viewed in an upright operating position of the device, can be arranged next to one another in a row in a vertically aligned sensor row, with the result that, therefore, the laser beam detector extends at least over a one-dimensional region on the laser receiver. In addition, usually an evaluation unit for determining the position of the laser receiver relative to the reference height defined by the rotating laser beam on the basis of the output of the laser beam detector and an indicator for the determined position (for example a visual display), in particular designed for indicating whether the laser receiver precisely coincides with the reference area, are integrated in the laser receiver device. In this case, the position can be determined, for example, on the basis of a ratio of a plurality of output signals (for example as the center point of that subregion on the laser beam detector row which is illuminated by the laser beam).

Such handheld laser receivers can be used in particular when the line depicted by the rotating laser beam can be perceived by the eye only with difficulty or not precisely enough. This is the case, for example, at relatively long distances from the rotating laser (for example owing to a divergence of the laser beam [→depicted line is too wide] or a low luminous efficacy [→depicted line is not visible enough] (which is subject to certain limits for eye safety reasons) and/or a high level of ambient brightness) or else when using laser light in the nonvisible wavelength range.

In such cases, it is now possible by means of such laser receivers to find the laser beam and indicate the laser plane (or reference height) defined by a rotating laser beam, read this laser plane and transmit the height information onto the site or onto a wall (etc.). For example, indicated by the laser receiver, a corresponding marking can be applied at the reference height.

For this, the laser receiver is moved by a user searching up and down in the vertical direction, for example, and finally brought into that position in which the indicator indicates a coincidence with the reference area. For example, a visual display which (for example by means of illuminated arrows or differently colored LEDs) provides information on whether a defined zero point of the laser receiver (for example an area center point of the detector area) is located precisely at the height of the reference area,
    above the reference area or
    below the reference area can be provided as indicator.

Furthermore, a numeric display of the relative position of the laser receiver with respect to the reference height can be used as indication, for example given in mm or inches.

Examples of such laser receivers are disclosed in the documents EP 2 199 739 A1 and U.S. Pat. No. 4,240,208.

In order to provide the user with simple transmission of the reference height determined and indicated by the laser receiver, a height mark can be provided on the housing of the laser receiver at the height of the defined zero point (for example a notch or a printed line laterally on the housing).

For a series of known functions and applications of a system comprising a rotating laser (in particular a dual-grade rotating laser) and a laser receiver, in addition (sometimes at least rough) knowledge of a laser receiver direction may be required or at least helpful, i.e. knowledge of a direction in which the laser receiver is located from the point of view of the rotating laser (for example with respect to a coordinate system which is internal to the rotating laser).

Examples of such functions and applications can in this case be grade-catch (also referred to as plane-catch or slope-catch), grade-lock (also referred to as plane-lock or slope-lock, possibly with tracking) or axis-alignment/axis-finding, as are known to a person skilled in the art. Specific aspects and embodiments with respect to these functions are also described, for example, in the patent literature publications U.S. Pat. No. 6,055,046 A, U.S. Pat. No. 6,314,650 B1 and U.S. Pat. No. 6,693,706 B2.

The following methods are in this case known from the prior art, for example (inter alia also from the publications mentioned in the directly preceding paragraph) for the determination of a laser receiver direction in a system comprising a rotating laser and a laser receiver:

1) Evaluation of a signal generated directly (in real time) after detection by the receiver of a beam, which signal is transmitted from the receiver to the rotator (for example by radio), and derivation of an emission angle at which the rotating laser beam was precisely at the time of impingement.

2) Defined inclination of the reference plane through a known inclination value and reading by the laser receiver of a height offset, effected thereby, of the beam strike on the detector of the laser receiver (with implementation of these steps for both inclination axes) and derivation of a direction to the receiver on the basis of the given relationship between the respective inclination angle difference and the respective height offset on the receiver.

3) Supplying of an information item which varies continuously in a manner dependent on the angle to a beam parameter of the laser radiation, which information item can be read by the receiver on the basis of the impinging beam and can be used to make the direction to the receiver derivable.

4) Iteratively halving windowing following striking or non-striking of the laser receiver in the respectively present angular range window (for example transmission of the beam only in the angular range of 0-180° if the receiver has indicated a strike: transmission of the beam only in the angular range of 0-90° if the receiver has not indicated a strike at 0-180°: transmission of the beam only in the angular range of 180°-270°, etc.).

The topic relating to determination of the laser receiver direction is handled inter alia also in the patent literature publication WO 2006/070009 A2.

However, the invention now relates in particular to the previously already explained beam leveling functionality of a rotating laser, in which the laser core module is suspended on an outer housing of the device such that it can be inclined precisely, in motorized fashion, for example about two axes (at least slightly in a range of, for example, ±5°) and is equipped with one or two inclination sensors or leveling sensors, whose output can be used as the output variable for an active change in the tilt position of the laser core module.

For the beam leveling functionality, adjustment and calibration is performed in the factory, in which such calibration data with respect to interaction of the leveling sensor and the tilting mechanism are stored in a memory that, via the calibration data, depending on an output of the leveling sensor, the mechanism can be actuated in a defined manner and thus the axis of rotation can be tilted in a targeted manner in such a way that the rotating laser beam also actually as precisely as possible spans a horizontal plane.

The adjustment of the laser beam (for example owing to the leveling sensor or the tilting mechanism) can change, however, as a result of various external influences, such as, for example, temperature and moisture fluctuations or mechanical vibrations, etc. Therefore, it is desirable to check and possibly recalibrate the plane or leveling accuracy of the rotating laser beam and its beam self-leveling functionality at regular intervals or as required.

For a recalibration of the rotating laser, in this case a wide variety of methods are known which can always only be implemented purely manually and are often selected and defined individually by a user depending on personal preference or personal knowledge, skills and capabilities.

In addition, for recalibration of the rotating laser, special calibrating telescopes are known, such as the one described in, for example, the European Patent Application with the number EP 12195754.2, which, in practice, is often only used for recalibrations in the factory owing to the complexity associated therewith, however.

SUMMARY

According to embodiments of the invention, beam leveling functionality of a rotating laser can be reliably recalibrated to meet a minimum standard. The recalibration can be implemented, in this embodiment, in a comparatively more simple manner and/or with comparatively less, in particular no, special recalibration equipment, and this in particular independently of the technical knowledge or knowledge, skills and capabilities of a device user.

The construction laser system relating to the invention comprises at least a rotating laser having a laser unit and a continuously rotatable deflection means for emitting a laser beam rotating about an axis of rotation in such a way that the rotating laser beam defines a reference area, and a laser receiver comprising a position-sensitive laser beam detector, which extends at least over a one-dimensional region on the laser receiver, with the result that the laser receiver is designed to generate an output signal depending on an impingement position of the laser beam on the laser beam detector.

The rotating laser is in this case further equipped with a calibrated beam leveling functionality, in particular a beam self-leveling functionality, and for this purpose has
  a leveling sensor,
  a mechanism for at least slightly tilting the axis of rotation relative to a stand of the rotating laser and
  a memory with such calibration data relating to an interaction of the leveling sensor and the mechanism that, via the calibration data, depending on an output of the leveling sensor, the mechanism can be actuated in a defined manner and thus the axis of rotation can be tilted in a targeted manner in such a way that the rotating laser beam spans a horizontal plane.

In addition, the construction laser system comprises an evaluation and control unit and communication means for transmitting the output signal from the laser receiver to the evaluation and control unit.

In accordance with the invention, a recalibration functionality which runs automatically at least partially by virtue of the evaluation and control unit for the beam leveling functionality is now provided, by means of which the beam leveling functionality can be checked automatically for its quality and in particular possibly the stored calibration data can be automatically updated.

For this, for the recalibration functionality, a sequence of N calibration measurements is defined, where N is greater than or equal to three, which calibration measurements are to be implemented by the rotating laser and the laser receiver with a respective I-th azimuthal alignment of the stand, where I is continuously from one to N, and with an in the process unchanged position of the laser receiver. As a preparatory measure, the laser receiver in this case needs to be erected spaced apart from the rotating laser in such a way that a rotating laser beam emitted roughly horizontally by the rotating laser impinges on the laser beam detector of the laser receiver.

According to the invention, as part of the recalibration functionality, the following now takes place for every I-th of the N calibration measurements, automatically controlled by the evaluation and control unit:

the rotating laser, using the beam leveling functionality, emits the rotating laser beam, and in an output signal reception mode, an output signal incoming via the communication means is detected by the evaluation and control unit and is stored as I-th output signal.

The respective change in the azimuthal alignments of the rotating laser between the measurements can in this case be performed, for example, by a user, for example guided by a visual or acoustic user guidance system which can be provided, for example, on the rotating laser (such as a display etc.). These aspects will be discussed once again in more detail further below.

In addition, the evaluation and control unit automatically reads the corresponding I-th impingement positions from the respective I-th output signals, evaluates these impingement positions in pairs correlated with the respective I-th azimuthal alignments and, on the basis of this evaluation, checks the quality of the beam leveling functionality (i.e. whether the plane emitted by the rotating laser beam actually meets the desired, defined requirements for leveling). In the event that the requirements are not met or else are not met sufficiently well, the calibration data stored for the beam leveling functionality can then be updated automatically by the evaluation and control unit.

This reading and evaluation of the respective I-th output signals or the respective I-th impingement positions performed by the control and evaluation unit can be implemented, for example, after termination of the second calibration measurement, after each further performed calibration measurement (or with a defined rhythm, or only after the last calibration measurement is ended, etc.). If this is performed after each calibration measurement, in one development, for example after an accumulation of, in a specific case, such a sufficient number of I-th impingement positions that the actual inclination with respect to the horizontal of the plane generated by the rotating laser beam can be determined sufficiently accurately or the degree of precision/accuracy for the determination of the inclination of the plane in the case of a further accumulation is no longer improved any more (standard deviation remains constant), the sequence of calibration measurements and therefore a further accumulation can be ended and, thereupon, the stored calibration data can be updated.

The sequence of the N calibration measurements for the recalibration functionality can generally be defined in such a way that the respective I-th azimuthal alignments cover at least a proportion of fixedly predetermined different azimuthal alignments of the stand relative to a direction in which the laser receiver is located, from the point of view of the rotating laser.

In a further development stage, in this case in addition the construction laser system can have a direction determination functionality (as examples of this are known from the prior art or as such a functionality is described, for example, in the European Patent Application with the number EP13160068.6), with the aid of which a present direction towards the laser receiver from the point of view of the rotating laser can be determined as the laser receiver direction.

The direction determination described in the European Patent Application with the number EP13160068.6 is performed in this case in accordance with the principle of a digital angle code with a plurality of tracks, wherein the plurality of tracks are generated or mapped over a plurality of rotational passes of the rotating laser beam.

For this case of availability of a direction determination functionality, as part of the recalibration functionality, for every I-th of the N calibration measurements, automatically controlled by the evaluation and control unit, using the direction determination functionality an I-th laser receiver direction can now be determined and in each case the I-th azimuthal alignment of the rotating laser relative to the laser receiver direction can be derived thereby.

For the sequence of calibration measurements, any desired alignments of the stand of the rotating laser can now be selected which are each determined concomitantly on the basis of the direction determination functionality as part of the sequence of recalibration for every I-th measurement.

That is to say that any desired selection of the respective I-th azimuthal alignment is thus possible. For example, it is thus also possible for azimuthal alignments which are distributed asymmetrically or randomly over the circumference to be used (in particular also distributed rotationally asymmetrically deliberately/in a targeted manner since, for this purpose, for example, the plane spanned by the rotating laser beam can be determined with a high degree of precision).

Alternatively, however, the sequence of the N calibration measurements for the recalibration functionality can be defined in such a way that every I-th azimuthal alignment of the stand relative to a direction in which the laser receiver is located, from the point of view of the rotating laser, is fixedly predetermined.

In particular in this case the order of the azimuthal alignments to be assumed successively as part of the calibration measurements can also be fixedly predetermined.

For such a fixedly predetermined sequence, in this case active direction determinations are not absolutely necessary. However, it is then necessary for the user to reorientate between the measurements in each case in respect of the azimuthal alignment of the stand with sufficient precision and in the correct sequence, with the result that in the respective I-th calibration measurement, the correct I-th alignment is also assumed by the rotating laser. The tolerance in respect of the required accuracy for the assumption of the respective I-th alignments can in this case be set comparatively high in practice, with the result that these alignments can be assumed easily in general also even when a user who is less skilled is performing the reorientation. Depending on how precisely and how reliably the beam leveling functionality is intended to be checked and calibrated, in this case deviations of up to +−5° or up to +−2°, for example, can be tolerated in this case for the assumption of the respective I-th alignments. For a standard user, it is in practice in this case easily possible, given the presence of fixed alignment markings on the housing of the rotating laser, to erect the device with the predetermined marked azimuthal alignment relative to the laser receiver with an accuracy of +−2° (skilled users in this case also reliably achieve an accuracy of +−1°). This can be performed by virtue of the housing being oriented correspondingly finely while aiming the laser receiver erected at a distance with the available marking (i.e. is adjusted correspondingly finely with pivoting about its stand axis), until the marking, by eye, points precisely in the direction of the laser receiver.

In accordance with a further aspect of the invention, the sequence can be defined with N being greater than or equal to four calibration measurements and the azimuthal alignments to be assumed in each case can be distributed rotationally symmetrically around the entire circumference of an azimuthal rotation of the stand. For example, specifically, the sequence can be defined with N being equal to four calibration measurements, and the azimuthal alignments to be assumed in each case can each be spaced apart by 90°.

As already mentioned at the outset as part of the description of the invention, in addition output means for outputting visual or acoustic indicators can be provided, which are actuated by the evaluation and control unit as part of the recalibration functionality in such a way that a user is thus guided by the sequence of N calibration measurements.

In particular, this can be performed and programmed, for example, in such a way that
  an indicator is displayed in order to request the user to reposition and assume the respective I-th azimuthal alignment of the stand,
  an indicator is displayed to indicate that the respective I-th azimuthal alignment of the stand has been sufficiently assumed and/or that this is successfully followed by a determination, performed automatically by the construction laser system, of the presently assumed I-th azimuthal alignment, and/or
  after termination of the respective I-th calibration measurement, an indicator is displayed to indicate that
    the next (I+1-th) azimuthal alignment of the stand is intended to be assumed,
    all of the N calibration measurements are complete, in particular in addition with supplementary indication of whether the stored calibration data can be checked on the basis of the N calibration measurements performed sufficiently profoundly and possibly updated with sufficient accuracy for the beam leveling functionality to meet a predetermined accuracy requirement.

LED lamps arranged on the rotating laser (which can illuminate in different colors, for example, and/or can blink with special rhythms or run continuously) can be provided as the display. However, a display with writing or symbols which can be represented can also be provided as indicators for specific communications to the user. Alternatively or in addition, a speech output or an audio output (for example with different pitches and/or tones with specific rhythms) can also be provided.

In accordance with a further aspect of the invention, in addition, as part of the construction laser system, a motorized rotatable platform can be provided for accommodating the rotating laser, which platform is actuated by the evaluation and control unit as part of the recalibration functionality in such a way that, for every I-th of the N calibration measurements, the rotating laser, automatically controlled, is brought into the I-th azimuthal alignment of the stand via rotation of the platform.

In particular, in this case the platform can be designed in such a way that a minimum error in respect of leveling of the platform can be ensured for a rotation and in particular the rotation is also subject to a minimum couple unbalance.

The provision of such a motorized rotatable platform on which the rotating laser can be positioned for implementing the recalibration functionality according to the invention, in this case enables full automation of the sequence, with the result that, therefore, if required the recalibration functionality can also be performed fully automatically, i.e. completely without any user interaction.

In accordance with a further aspect of the invention, as part of the recalibration functionality, for every I-th of the N calibration measurements, possibly automatically controlled by the evaluation and control unit, the output signal reception mode can be switched on
  triggered by a user input,
  triggered by a defined time clock signal and/or
  triggered by the construction laser system, in particular the rotating laser and/or laser receiver, establishing that a defined event has occurred.

In one embodiment, wherein the output signal reception mode can be switched on depending on the construction laser system establishing that a defined event has occurred, in addition as part of the recalibration functionality, for every I-th of the N calibration measurements, automatically controlled by the evaluation and control unit, on the basis of an output of the leveling sensor a present keep-steady state of the rotating laser can be measured continuously and, in the event of a defined keep-steady threshold value being maintained, a signal can be generated, by means of which switch-on of the output signal reception mode is enabled (or as a result the output signal reception mode is switched on directly).

Furthermore, the laser receiver can also
  have a motion sensor, in particular an acceleration sensor, a rotation rate sensor and/or an inclination or leveling sensor,
  have an internal functionality for continuous measurement of a present keep-steady state of the laser receiver,
  be designed to generate a signal which is dependent on a defined keep-steady threshold value being maintained and
  be designed to transmit, via the communication means, the signal from the laser receiver to the evaluation and control unit,
with the result that, as part of the recalibration functionality, for every I-th of the N calibration measurements, automatically controlled by the evaluation and control unit, switch-on of the output signal reception mode can also be enabled on the basis of reception of an above-described signal transmitted by the laser receiver to the evaluation and control unit (or in particular as a result the output signal reception mode can be switched on directly).

In accordance with a further aspect of the invention, the laser receiver is designed to continuously transmit, via the communication means, output signals after impingement of the laser beam on the laser beam detector. Alternatively or in addition, the laser receiver can, however, also be designed to continuously transmit, via the communication means, in event-controlled fashion, output signals after impingement of the laser beam, wherein the transmission is triggerable, for example,
  by a user input,
  by a defined time clock signal or by the construction laser system, in particular the rotating laser and/or the laser receiver, establishing that a defined event has occurred.

In accordance with a further aspect of the invention, as part of the recalibration functionality, for every I-th of the N calibration measurements, automatically controlled by the evaluation and control unit, in the output signal reception mode in each case a plurality of output signals incoming via the communication means are detected.

Consequently, this plurality of respective I-th output signals incoming per calibration measurements (in respect of the I-th impingement position) is then averaged, for example directly by the laser receiver or directly on detection by the evaluation and control unit, and an averaged value can be stored as I-th output signal or I-th impingement position.

Alternatively, these many respective I-th output signals incoming per calibration measurements can also each be stored, wherein the evaluation and control unit then reads the corresponding respective many I-th impingement positions from the respective many I-th output signals and averages these first for the evaluation performed in pairs correlated with the respective I-th azimuthal alignment.

In accordance with a further aspect of the invention, the rotating laser can
- be in the form of a dual-grade rotating laser and/or
- be equipped with a grade-catch functionality, a grade-lock functionality, in particular with tracking functionality and/or an axis-alignment functionality, as has long been known from the prior art.

The location or the point where the evaluation and control unit are physically accommodated or provided as part of the system according to the invention can in this case be selected depending on needs/requirements and depending on the desired design, such as, for example, in the rotating laser, but also in the receiver or in a third physical component, or even distributed among a plurality of physical units such as, for example, proportionally distributed over the receiver and the rotating laser, wherein, in the receiver, a first proportion of the evaluation (for example preprocessing) can be performed and in the rotating laser the further-processing and ultimate direction determination from the preprocessed data can be performed.

Depending on the localized accommodation of the evaluation unit, in addition different types of communication means with corresponding communication interfaces can be provided, which communication means are designed to transmit the output signal to the evaluation unit or, if the evaluation unit is designed and accommodated so as to be physically distributed over a plurality of units, to transmit data between the parts of the evaluation unit. For example, radio links or other wireless or wired data links can be used for this, as have long been known from the prior art.

By virtue of the above-described invention with its various aspects and developments, one possibility is now provided for reliable recalibration of a beam leveling functionality of a rotating laser which meets a minimum standard. The recalibration sequence can in this case be implemented comparatively easily and with comparatively little, in particular no, special recalibration equipment. In addition, the recalibration functionality according to the invention can now be performed substantially independently of the technical knowledge or the knowledge, skills and capabilities of a device user and, in its fully automated embodiment, can even be performed completely without the device user.

In addition, the invention also relates to a rotating laser for use as part of the above-described construction laser system. The rotating laser is in this case correspondingly equipped with
- a laser unit and a continuously rotatable deflection means, for emitting a rotating laser beam in such a way that the rotating laser beam defines a reference area,
- a calibrated beam leveling functionality, in particular a beam self-leveling functionality, for which purpose the rotating laser furthermore has a leveling sensor,
    - a mechanism for at least slightly tilting the axis of rotation relative to a stand of the rotating laser, and
    - a memory with such calibration data relating to an interaction of the leveling sensor and the mechanism that, via the calibration data, depending on an output of the leveling sensor, the mechanism can be actuated in a defined manner and thus the axis of rotation can be tilted in a targeted manner in such a way that the rotating laser beam spans a horizontal plane,
- an evaluation and control unit and
- a communication interface for receiving an output signal which is dependent on the laser beam impingement position and which can be generated by a laser receiver on which the rotating laser beam impinges.

In accordance with the invention, in turn, by the evaluation and control unit, an at least partially automatically running recalibration functionality for the beam leveling functionality is provided, wherein, for the recalibration functionality, a sequence of N calibration measurements is defined, where N is greater than or equal to three, which calibration measurements are to be implemented by the rotating laser and the laser receiver with a respective I-th azimuthal alignment of the stand, where I is continuously from one to N, and with an in the process unchanged position of the laser receiver.

In this case, as part of the recalibration functionality, the following is performed for every I-th of the N calibration measurements, automatically controlled by the evaluation and control unit:
- the rotating laser, using the beam leveling functionality, emits the rotating laser beam, and
- in an output signal reception mode, an output signal incoming via the communication interface is detected by the evaluation and control unit and is stored as I-th output signal.

In addition, as part of the recalibration functionality, by means of the evaluation and control unit automatically
- the corresponding I-th impingement positions are read from the respective I-th output signals,
- these impingement positions are evaluated in pairs correlated with the respective I-th azimuthal alignments, and
- on the basis of this, the stored calibration data are checked and in particular possibly updated.

The specific aspects, embodiments and developments mentioned in connection with the construction laser system described above can in this case possibly likewise also be applied analogously to the rotating laser.

In addition, the invention also relates to a method for recalibrating a beam leveling functionality of a rotating laser with the aid of a laser receiver, wherein the rotating laser is designed for emitting a laser beam rotating about an axis of rotation in such a way that the rotating laser beam defines a reference area.

In this case, in turn the rotation laser has at least a laser unit and a continuously rotating deflection means and the beam leveling functionality, in particular beam self-leveling functionality. In order to provide the beam leveling functionality, the rotating laser in this case furthermore has a leveling sensor, a mechanism for at least slightly tilting the axis of rotation relative to a stand of the rotating laser (in particular in two axes), and a memory with such calibration data relating to an interaction of the leveling sensor and the mechanism that, via the calibration data, depending on an output of the leveling sensor, the mechanism can be actuated in a defined manner and thus the axis of rotation can be tilted in a targeted manner in such a way that the rotating laser beam spans a horizontal plane.

The laser receiver is equipped with a laser beam detector which extends at least over a one-dimensional region on the laser receiver, with the result that the laser receiver is designed to generate an output signal depending on an impingement of the laser beam on the laser beam detector.

The method according to the invention is in this case characterized by a sequence of N calibration measurements, where N is greater than or equal to three, which calibration measurements are implemented by the rotating laser and the laser receiver with a respective I-th azimuthal alignment of the stand, where I is continuously from one to N, and with an in the process unchanged position of the laser receiver.

In this case, for every I-th of the N calibration measurements, automatically by means of the rotating laser, using the beam leveling functionality the rotating laser beam is emitted, and in an output signal reception mode, an incoming output signal of the laser receiver is detected and is stored as I-th output signal.

In addition, according to the invention, the following steps are automatically performed by an evaluation unit of the rotating laser:

reading the corresponding I-th impingement positions from the respective I-th output signals, evaluating said impingement positions, wherein the evaluation takes place in pairs correlated with the respective I-th azimuthal alignments, and checking and possibly updating the stored calibration data on the basis of a result of the evaluation.

The specific aspects, embodiments and developments mentioned in connection with the construction laser system described above can in this case likewise also be applied analogously to this method.

In addition, the invention also relates to a computer program product comprising program code which is stored on a machine-readable storage medium and contains stored information items according to the invention relating to a sequence of N calibration measurements, where N is greater than or equal to three, which calibration measurements are implemented by the rotating laser and the laser receiver with a respective I-th azimuthal alignment of the stand, where I is continuously from one to N, and with an in the process unchanged position of the laser receiver.

In this case, the computer program product contains such a program code that it is designed for implementing the above-described method, in particular when the program is run on an electronic data processing unit, specifically wherein the electronic data processing unit is used as the control and evaluation unit of the above-described construction laser system or as the control and evaluation unit of the above-described rotating laser.

The specific aspects, embodiments and developments mentioned in connection with the above-described construction laser system can in this case likewise also be applied analogously to this computer program product.

BRIEF DESCRIPTION OF THE DRAWINGS

The method according to the invention and the apparatus according to the invention will be described in more detail purely by way of example below with reference to specific exemplary embodiments illustrated schematically in the drawings, wherein details are also given of further advantages of the invention. Specifically.

DETAILED DESCRIPTION

Figure 1:
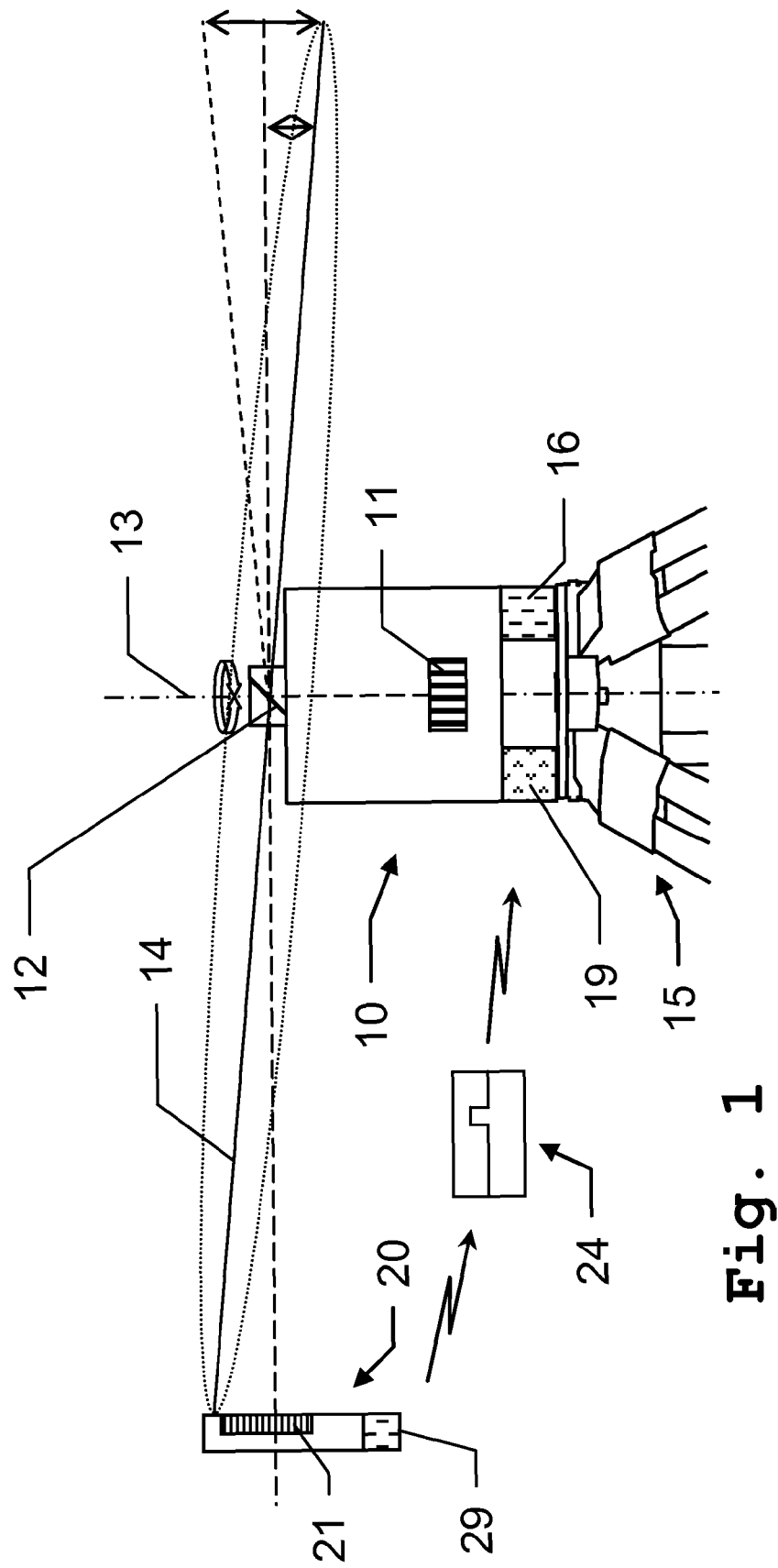
FIG. 1 shows a schematic exemplary embodiment of a construction laser system according to the invention.

FIG. 1 shows an exemplary embodiment of a construction laser system according to the invention comprising a rotating laser 10 having a laser unit 11 and a rotatable deflection means 12 for emitting a rotating laser beam 14, wherein the rotating laser beam defines a reference area, and a laser receiver 20 comprising a laser beam detector 21, which extends at least over a one-dimensional region on the laser receiver and is designed to generate an output signal 24 depending on an impingement position of the laser beam on the laser beam detector. In addition, an evaluation and control unit 16 is provided.

In this case, the rotating laser 10 has the beam leveling functionality to be recalibrated, in particular a beam self-leveling functionality to be recalibrated. In order to provide this functionality, the rotating laser in this case has a leveling sensor, a mechanism for at least slightly tilting the axis of rotation relative to a stand of the rotating laser (in particular about two axes such as, for example, an x axis and a y axis) and a memory with such calibration data relating to an interaction of the leveling sensor and the mechanism that, via the calibration data, depending on an output of the leveling sensor, the mechanism can be actuated in a defined manner and thus the axis of rotation can be tilted in a targeted manner in such a way that the rotating laser beam spans a horizontal plane.

Such mechanisms and sensor systems have long been known in this connection from the prior art. Thus, for example, a core of the rotating laser (i.e. a laser core module) which comprises in particular the laser unit and the rotatable deflecting prism can be suspended on an outer housing of the device in such a way that it can be inclined precisely, in motorized fashion, about two axes, such as, for example, an x axis and a y axis (at least in each case slightly within a range of, for example, ±5°) and can be equipped with the inclination sensor or leveling sensor whose display or signal is read and is used as output variable for actively changing the position of inclination of the laser core module.

In addition, the rotating laser, as has likewise long been known, can in this case also have a function (with corresponding mechanisms, sensor systems and control systems) for the targeted, desired inclination of the laser plane relative to the horizontal about the two axes. For this, the laser core module of the rotating laser can be inclined in a targeted manner, in motorized fashion, about one of or both axes and brought into a desired position of inclination, with the result that, therefore, the axis of rotation and consequently also the spanned plane are inclined as desired.

As illustrated in FIG. 1, in the case of the rotating laser illustrated here, the beam leveling functionality is disrupted, with the result that a strictly horizontally aligned plane is not spanned by the rotating laser beam 14, but rather a plane that is slightly inclined with respect to the horizontal.

In accordance with the invention, as is illustrated in more detail in FIG. 2 and FIGS. 3-6, an at least partially automatically running recalibration functionality is provided for checking or recalibrating the beam leveling functionality by means of the evaluation and control unit 16, wherein a sequence of N calibration measurements is defined, where N is greater than or equal to three, which calibration measurements are to be implemented by the rotating laser and the laser receiver with a respective I-th azimuthal alignment of the stand, where I is continuously from one to N, and with an in the process unchanged position of the laser receiver.

As part of the recalibration functionality, in this case, for every I-th of the N calibration measurements, the following are performed, automatically controlled by the evaluation and control unit:
the rotating laser, using the beam leveling functionality, emits the rotating laser beam and
in an output signal reception mode, an output signal incoming via the communication interface is detected by the evaluation and control unit and stored as I-th output signal.

In addition, as part of the recalibration functionality, by means of the evaluation and control unit, automatically
the corresponding I-th impingement positions are read from the respective I-th output signals,
said impingement positions are evaluated in pairs correlated with the respective I-th azimuthal alignments, and on the basis of this, the stored calibration data are checked and in particular possibly updated.

In the embodiment shown with respect to the physical accommodation of the evaluation and control unit 16, in this case, by way of example, the wireless communication means are formed with a communication interface 19 on the rotating laser side, at least one which receives data, and a communication interface 29 on the laser receiver side, at least one which transmits data (in particular in each case radio modules), with the result that the output signal 24 can thereby be transmitted to the evaluation and control unit 19.

Specifically, in accordance with the invention, therefore, a possibility is now provided for reliable recalibration of the beam leveling functionality of a rotating laser which meets a minimum standard. The recalibration sequence can in this case be implemented comparatively easily and with comparatively little, in particular no, special recalibration equipment. In addition, the recalibration functionality according to the invention can now be implemented substantially independently of the technical knowledge or the knowledge, skills or capabilities of a device user or, in its fully automated embodiment, can even be performed completely without a device user.

For the rotating laser 10 in this case erected on a tripod 15, in this case specifically individual embodiments of laser sources for the laser unit 11, in particular diode lasers, are known from the prior art. The laser radiation emitted by the laser unit 11 along its beam path impinges on a laser radiation deflection unit 12, which deflects the laser beam through 90° in the example illustrated. The laser radiation deflection unit 12 is in the form of, for example, a mirror which is tilted through 45° with respect to the incident laser radiation, but preferably in the form of a pentaprism or pentamirror, which always deflects the laser radiation through 90° irrespective of the angle of incidence. The laser radiation deflection unit 12 is operatively connected to a rotation-inducing unit in such a way that the laser radiation deflection unit 12 rotates, possibly in motor-drivable fashion, about an axis of rotation 13. The rotation unit is in the form of a sleeve which is mounted on ball bearings, surrounds the beam path of the laser radiation and is driven by an electric motor via a belt drive. Therefore, the emission of laser radiation 14 is performed in a rotating emission direction a, with the result that the illustrated quasi laser plane is produced. The point of intersection of this quasi laser plane with the axis of rotation 13 is defined as the center of rotation. The center of rotation can be surrounded by a transparent exit window such that the laser radiation can pass to the outside through the exit window. Means, for example in the form of an angle detector, can be arranged indirectly on the rotation unit 3, which means enable detection of the respectively present angular alignment of the laser radiation deflection unit 12 (i.e. an item of angle information with respect to a respective present rotary position of the deflection means 12) and therefore of the respective emission direction a of the laser radiation 5.

The laser beam detector 21 of the laser receiver 20 is in this case designed, for example, as known from the prior art, in such a way that an impingement position of the laser beam on the laser beam detector line or area can be derived, for which purpose the photosensitive elements, when viewed in the upright operating position of the device, can be arranged next to one another in a row in a vertically aligned sensor row, with the result that, therefore, the laser beam detector 21 extends at least over a vertical line (in the form of a one-dimensional region) on the laser receiver 20. In addition, a dedicated evaluation unit, for example for determining the position of the laser receiver relative to the reference height defined by the rotating laser beam on the basis of the output of the laser beam detector 20, and an indicator for the determined position (for example a visual display), in particular designed for indicating whether the laser receiver 20 precisely coincides with the reference area, can also be integrated in the laser receiver 20 in the laser receiver device. In this case, the position can be determined, for example, as the center point of that region on the laser beam detector row which is illuminated by the laser beam.

Figure 2:
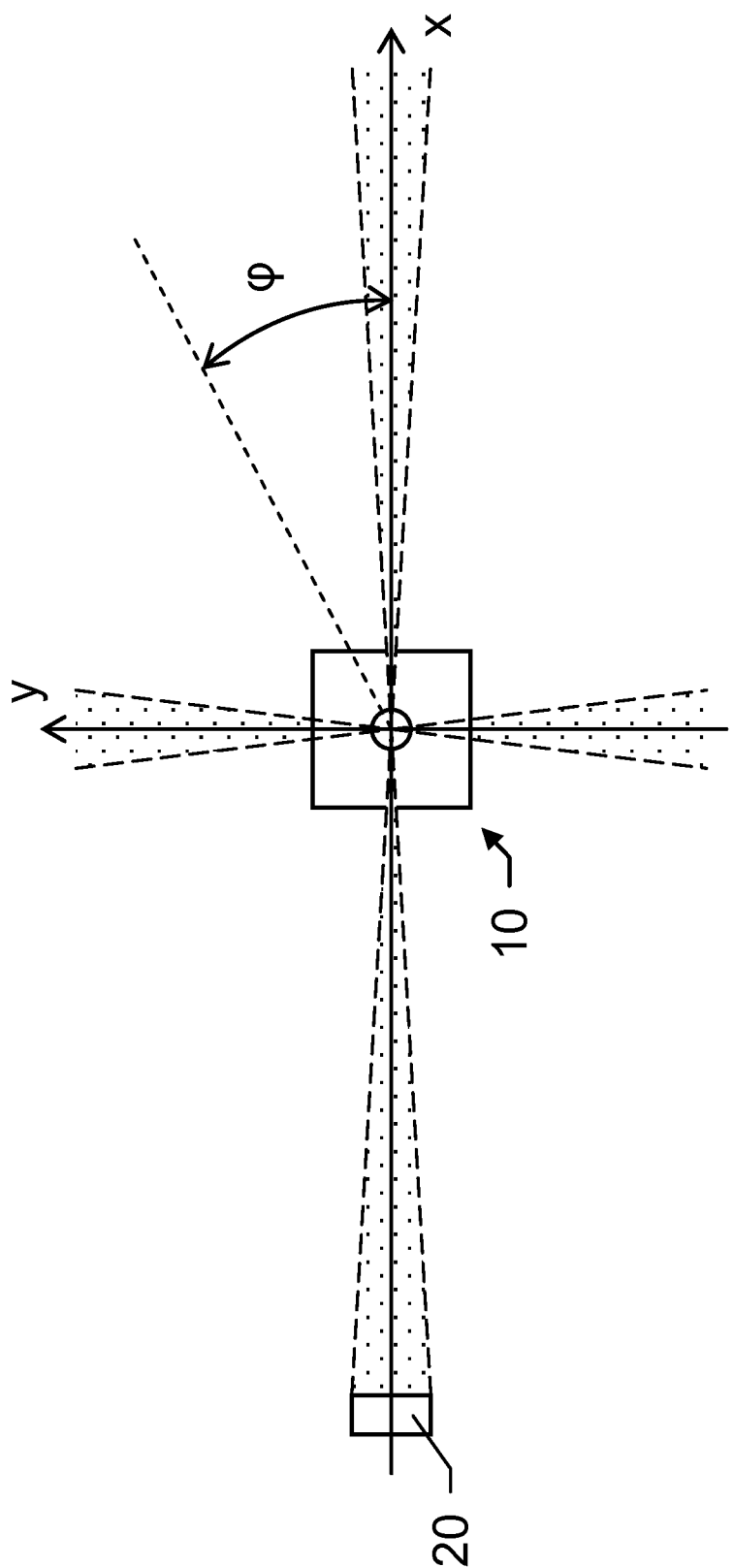
FIG. 2 shows a plan view of the exemplary embodiment shown in FIG. 1.
Figure 3:
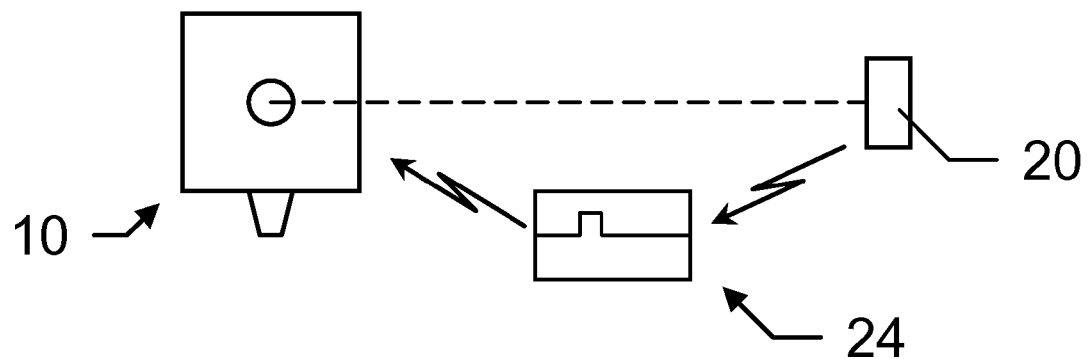
FIGS. 3-6 show four calibration measurements which are performed with four different azimuthal alignments of the rotating laser relative to the laser receiver direction.
Figure 4:
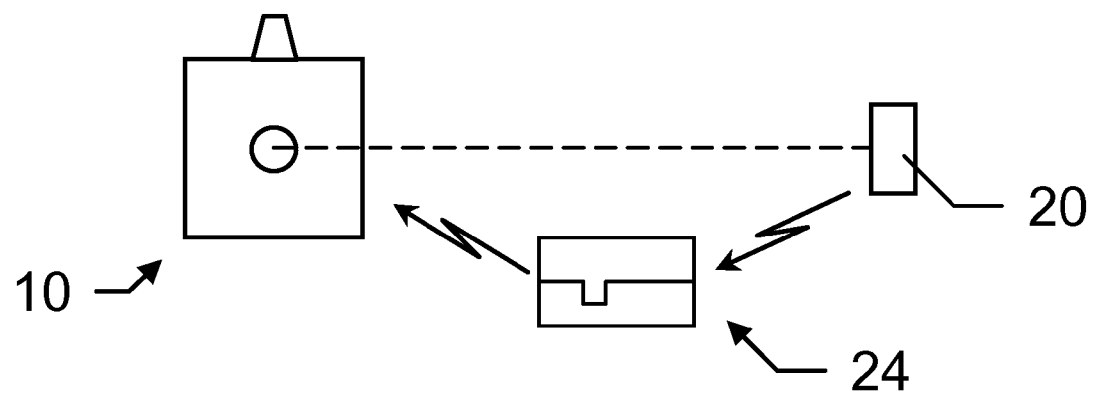
Figure 5:
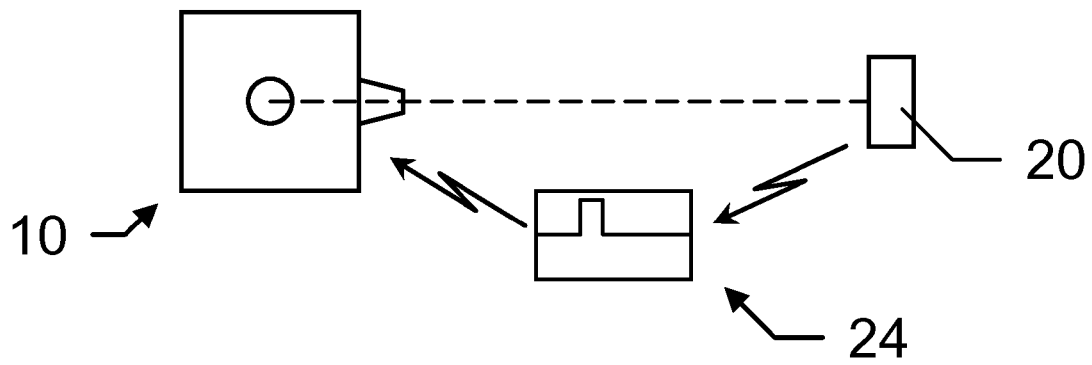
Figure 6:
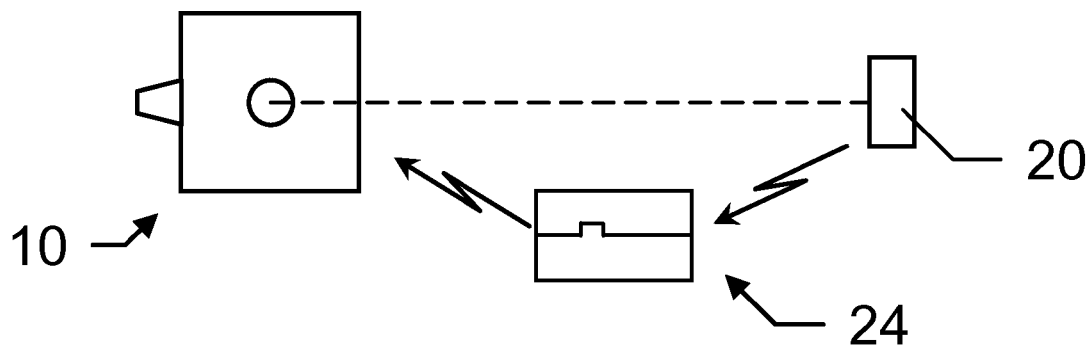

FIG. 2 shows a plan view of the exemplary embodiment shown in FIG. 1 comprising the rotating laser 10 and the laser receiver 20.

By virtue of the mechanism provided on the rotating laser side for at least slightly tilting the axis of rotation relative to a stand of the rotating laser about two axes (an x axis and a y axis), four directions are now defined within the rotating laser, namely a +x direction, a −x direction, a +y direction and a −y direction.

The rotating laser 10 shown in FIG. 2 is in this case erected with such a defined azimuthal alignment relative to the direction in which the laser receiver is located that its −x direction points in the laser receiver direction.

As explained at the outset as part of the general description of the invention, the sequence can be defined with, for example, precisely four calibration measurements, and the respective azimuthal alignments to be assumed in this case can each be spaced apart from one another through 90°, wherein the four azimuthal alignments relative to the laser receiver direction are in this case now provided in such a way that, for the four calibration measurements, the +x direction, the −x direction, the +y direction and the −y direction of the rotating laser in each case point once precisely in the direction of the laser receiver.

In this case, in each case tolerance ranges for the four predetermined azimuthal alignments to be assumed are illustrated by dotted lines in FIG. 2.

In this case, now four calibration measurements are illustrated in FIGS. 3 to 6, wherein the rotating laser 10 is now oriented, in order, with precisely the four predetermined different azimuthal alignments relative to the laser receiver direction, which have been explained as part of the description relating to FIG. 2, i.e.

- in one case such that its +x direction points precisely in the direction of the laser receiver 20 (1st alignment as part of the 1st calibration measurement, wherein the output signal 24 which is dependent on the laser beam impingement position and is transmitted in the process is detected as the 1st output signal),
- in one case such that its −x direction points precisely in the direction of the laser receiver 20 (2nd alignment as part of the 2nd calibration measurement, wherein the output signal 24 which is transmitted in the process and is dependent on the laser beam impingement position is detected as the 2nd output signal),
- in one case such that its +y direction points precisely in the direction of the laser receiver 20 (3rd alignment as part of the 3rd calibration measurement, wherein the output signal 24 which is transmitted in the process and is dependent on the laser beam impingement position is detected as the 3rd output signal), and
- in one case such that its −y direction points precisely in the direction of the laser receiver 20 (4th alignment as part of the 4th calibration measurement, wherein the output signal 24 which is transmitted in the process and is dependent on the laser beam impingement position is detected as the 4th output signal).

The corresponding I-th impingement positions can now be read from the respective I-th output signals. These impingement positions can be evaluated in pairs correlated with the respective known I-th azimuthal alignments and, on the basis of this, the leveling accuracy of the self-leveling can be checked and possibly the calibration data stored for the self-leveling updated.

It goes without saying that these illustrated figures are only schematic representations of possible exemplary embodiments. The various approaches can likewise be combined with one another and with methods from the prior art.

What is claimed is:

1. A construction laser system comprising:
    a rotating laser including a laser unit and a continuously rotatable deflection means for emitting a laser beam rotating about an axis of rotation such that the rotating laser beam defines a reference area, wherein the rotating laser is equipped with a calibrated beam self-leveling functionality and, associated with the calibrated beam self-leveling functionality, the rotating laser further includes:
    a leveling sensor;
    a mechanism for at least slightly tilting the axis of rotation relative to a stand of the rotating laser; and
    a memory with such calibration data relating to an interaction of the leveling sensor and the mechanism that, via the calibration data, depending on an output of the leveling sensor, the mechanism can be actuated in a defined manner and thus the axis of rotation can be tilted in a targeted manner in such a way that the rotating laser beam spans a horizontal plane;
    a laser receiver comprising a position-sensitive laser beam detector, which extends at least over a one-dimensional region on the laser receiver, with the result that the laser receiver is adapted to generate an output signal depending on an impingement position of the laser beam on the laser beam detector;
    an evaluation and control unit; and
    communication means for transmitting the output signal from the laser receiver to the evaluation and control unit, wherein,
        an at least partially automatically running recalibration functionality for the calibrated beam self-leveling functionality is provided by the evaluation and control unit;
        for the recalibration functionality, a sequence of N calibration measurements is defined, where N is greater than or equal to three, which calibration measurements are implemented by the rotating laser and the laser receiver with a respective I-th azimuthal alignment of the stand, where I is continuously from one to N, and with an in-the-process unchanged position of the laser receiver;
        as part of the recalibration functionality:
            for every I-th of the N calibration measurements, automatically controlled by the evaluation and control unit:
                the rotating laser, using the beam leveling functionality, emits the rotating laser beam; and
                in an output signal reception mode, an output signal incoming via the communication means is detected by the evaluation and control unit and is stored as the I-th output signal; and
            the evaluation and control unit automatically:
                reads the corresponding I-th impingement positions from the respective I-th output signals;
                evaluates these impingement positions in pairs correlated with the respective I-th azimuthal alignments; and
                on the basis of this, checks and possibly updates the stored calibration data.

2. The construction laser system according to claim 1, wherein:
    the sequence of the N calibration measurements for the recalibration functionality is defined in such a way that the respective I-th azimuthal alignments cover at least a proportion of fixedly predetermined different azimuthal alignments of the stand relative to a direction in which the laser receiver is located, from the point of view of the rotating laser.

3. The construction laser system according to claim 1, further comprising:
    direction determination functionality for determining a present direction towards the laser receiver from the point of view of the rotating laser as the laser receiver direction, wherein:
        as part of the recalibration functionality, for every I-th of the N calibration measurements, automatically controlled by the evaluation and control unit, using the direction determination functionality an I-th laser receiver direction is determined and in each case the I-th azimuthal alignment of the rotating laser relative to the laser receiver direction is derived thereby.

4. The construction laser system according to claim 1, wherein:
    the sequence of the N calibration measurements for the recalibration functionality is defined such that every I-th azimuthal alignment of the stand relative to a direction in which the laser receiver is located, from the point of view of the rotating laser, is fixedly predetermined.

5. The construction laser system according to claim 1, wherein:
the sequence is defined with N being greater than or equal to four calibration measurements and the azimuthal alignments to be assumed in each case are distributed rotationally symmetrically around the entire circumference of an azimuthal rotation of the stand and the azimuthal alignments to be assumed in each case are each spaced apart through 90°.

6. The construction laser system according to claim 5, wherein:
the sequence is defined with N being equal to four calibration measurements.

7. The construction laser system according to claim 1, further comprising:
output means for outputting visual indicators, the output means being actuated by the evaluation and control unit as part of the recalibration functionality such that a user is thus guided through the sequence of N calibration measurements.

8. The construction laser system according to claim 7, wherein the user is guided through the sequence of N calibration measurements by at least one of:
an indicator being displayed in order to request the user to reposition and assume the respective I-th azimuthal alignment of the stand;
an indicator being displayed to indicate that the respective I-th azimuthal alignment of the stand has been sufficiently assumed and/or that this is successfully followed by a determination, performed automatically by the construction laser system, of the presently assumed I-th azimuthal alignment; and
after termination of the respective I-th calibration measurement, an indicator being displayed to indicate that:
the next (I+1-th) azimuthal alignment of the stand is intended to be assumed; and
all of the N calibration measurements are complete, in addition with supplementary indication of whether the stored calibration data can be checked on the basis of the N calibration measurements performed sufficiently profoundly and possibly updated with sufficient accuracy for the beam leveling functionality to meet a predetermined accuracy requirement.

9. The construction laser system according to claim 1, further comprising:
a motorized rotatable platform for accommodating the rotating laser, the platform being actuated by the evaluation and control unit as part of the recalibration functionality such that, for every I-th of the N calibration measurements, the rotating laser, automatically controlled, is brought into the I-th azimuthal alignment of the stand via rotation of the platform.

10. The construction laser system according to claim 9, wherein:
the platform is configured such that that a minimum error in respect of leveling of the platform can be ensured for a rotation; and
the rotation is subject to a minimum couple unbalance.

11. The construction laser system according to claim 1, wherein:
as part of the recalibration functionality, for every I-th of the N calibration measurements, automatically controlled by the evaluation and control unit, the output signal reception mode is switched by at least one of being:

triggered by user input;
triggered by a defined time clock signal; and
triggered by the rotating laser and/or the laser receiver establishing that a defined event has occurred.

12. The construction laser system according to claim 11, wherein:
the output signal reception mode can be switched on depending on the construction laser system establishing that a defined event has occurred;
as part of the recalibration functionality, for every I-th of the N calibration measurements, automatically controlled by the evaluation and control unit, on the basis of an output of the leveling sensor, a present keep-steady state of the rotating laser is measured continuously and, in the event of a defined keep-steady threshold value being maintained, a signal is generated, by means of which switch-on of the output signal reception mode is enabled; and
as a result, the output signal reception mode is switched on directly.

13. The construction laser system according to claim 11, wherein:
the output signal reception mode can be switched on depending on the construction laser system establishing that a defined event has occurred;
the laser receiver:
has an acceleration sensor, a rotation rate sensor and/or an inclination or leveling sensor;
has an internal functionality for continuous measurement of a present keep-steady state of the laser receiver;
is configured to generate a signal which is dependent on a defined keep-steady threshold value being maintained; and
is configured to transmit, via the communication means, the signal from the laser receiver to the evaluation and control unit;
as part of the recalibration functionality, for every I-th of the N calibration measurements, automatically controlled by the evaluation and control unit, on the basis of reception of the signal, switch-on of the output signal reception mode is enabled; and
as a result, the output signal reception mode is switched on directly.

14. The construction laser system according to claim 1, wherein:
the laser receiver is configured to continuously transmit, via the communication means, output signals after impingement of the laser beam on the laser beam detector and/or to transmit, via the communication means, in event-controlled fashion, output signals after impingement of the laser beam; and
the transmission is triggerable by at least one of:
user input,
a defined time clock signal; and
the rotating laser and/or the laser receiver establishing that a defined event has occurred.

15. The construction laser system according to claim 1, wherein:
as part of the recalibration functionality, for every I-th of the N calibration measurements, automatically controlled by the evaluation and control unit, in the output signal reception mode in each case a plurality of output signals incoming via the communication means are detected; and
the construction laser system is configured to perform at least one of:

averaging over the output signals and storing an averaged value as the I-th output signal; and storing many I-th output signals, wherein the evaluation and control unit then reads the corresponding many I-th impingement positions from the respective many I-th output signals and evaluates said impingement positions, averaged, in each case in pairs correlated with the respective I-th azimuthal alignments.

16. A rotating laser adapted to be included in a construction laser system, the rotating laser comprising:

a laser unit and a continuously rotatable deflection means, for emitting a rotating laser beam such that the rotating laser beam defines a reference area;

calibrated beam self-leveling functionality, and, associated with the calibrated beam self-leveling functionality, the rotating laser further includes:

a leveling sensor;

a mechanism for at least slightly tilting the axis of rotation relative to a stand of the rotating laser; and a memory with such calibration data relating to an interaction of the leveling sensor and the mechanism that, via the calibration data, depending on an output of the leveling sensor, the mechanism can be actuated in a defined manner and thus the axis of rotation can be tilted in a targeted manner in such a way that the rotating laser beam spans a horizontal plane;

an evaluation and control unit; and a communication interface for receiving an output signal which can be generated by a laser receiver on which the rotating laser beam impinges and which is dependent on the laser beam impingement position, wherein:

an at least partially automatically running recalibration functionality for the calibrated beam self-leveling functionality is provided by the evaluation and control unit;

for the recalibration functionality, a sequence of N calibration measurements is defined, where N is greater than or equal to three, which calibration measurements are implemented by the rotating laser and the laser receiver with a respective I-th azimuthal alignment of the stand, where I is continuously from one to N, and with an in-the-process unchanged position of the laser receiver;

as part of the recalibration functionality:

for every I-th of the N calibration measurements, automatically controlled by the evaluation and control unit:

the rotating laser, using the beam leveling functionality, emits the rotating laser beam; and in an output signal reception mode, an output signal incoming via the communication means is detected by the evaluation and control unit and is stored as the I-th output signal; and the evaluation and control unit automatically:

reads the corresponding I-th impingement positions from the respective I-th output signals;

evaluates these impingement positions in pairs correlated with the respective I-th azimuthal alignments; and on the basis of this, checks and possibly updates the stored calibration data.

17. A method for recalibrating a beam self-leveling functionality of a rotating laser with the aid of a laser receiver, wherein the rotating laser is configured to emit a laser beam rotating about an axis of rotation such that the rotating laser beam defines a reference area, and wherein the rotating laser includes:

a laser unit and a continuously rotatable deflection means; and the beam self-leveling functionality and, associated with the beam self-leveling functionality, the rotating laser further includes:

a leveling sensor;

a mechanism for at least slightly tilting the axis of rotation relative to a stand of the rotating laser; and a memory with such calibration data relating to an interaction of the leveling sensor and the mechanism that, via the calibration data, depending on an output of the leveling sensor, the mechanism can be actuated in a defined manner and thus the axis of rotation can be tilted in a targeted manner in such a way that the rotating laser beam spans a horizontal plane;

an evaluation and control unit;

wherein, the laser receiver is equipped with a laser beam detector which extends at least over a one dimensional region on the laser receiver, such that the laser receiver is adapted to generate an output signal depending on an impingement of the laser beam on the laser beam detector;

the method comprising:

performing a sequence of N calibration measurements, where N is greater than or equal to three, which calibration measurements are implemented by the rotating laser and the laser receiver with a respective I-th azimuthal alignment of the stand, where I is continuously from one to N, and with an in-the-process unchanged position of the laser receiver; and for every I-th of the N calibration measurements, automatically by means of the rotating laser:

using the beam leveling functionality, emitting the rotating laser beam; and in an output signal reception mode, detecting an incoming output signal of the laser receiver and storing the detected output signal as I-th output signal; and using the rotating laser, automatically performing:

reading the corresponding I-th impingement positions from the respective I-th output signals;

evaluating said impingement positions, wherein the evaluation takes place in pairs correlated with the respective I-th azimuthal alignments, and checking and possibly updating the stored calibration data on the basis of a result of the evaluation.

18. A computer program product comprising:

program code which is stored on a non-transitory machine-readable storage medium and contains stored information items relating to a sequence of N calibration measurements, where N is greater than or equal to three, which calibration measurements are implemented by the rotating laser and the laser receiver with a respective I-th azimuthal alignment of the stand, where I is continuously from one to N, and with an in-the-process unchanged position of the laser receiver, wherein:

the program code is adapted to implement the method claimed in claim 17 when the program code is run on an electronic data processing unit that is used as the control and evaluation unit associated with a construction laser system.

19. The computer program product according to claim 18, wherein:

the electronic data processing unit is used as the control and evaluation unit of the construction laser system according to claim 1.

20. The computer program product according to claim 18, wherein:
the electronic data processing unit is used as the control and evaluation unit of the rotating laser according to claim 16.

* * * * *